Dec. 10, 1929. V. CONTINSOUZA ET AL 1,739,442
CORRECTING DEVICE FOR CINEMATOGRAPHS
WITH CONTINUOUSLY MOVING FILMS
Filed March 17, 1927 2 Sheets-Sheet 1
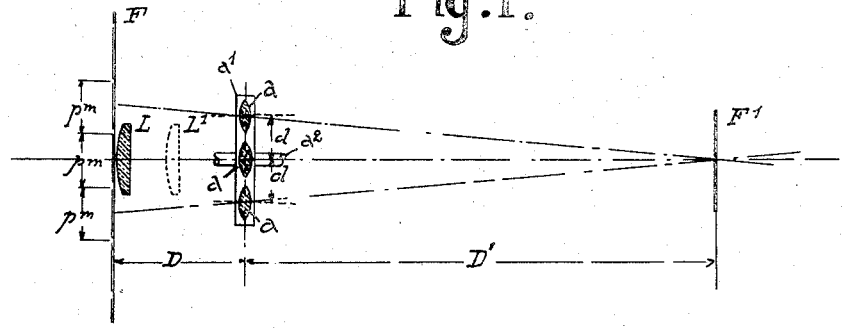
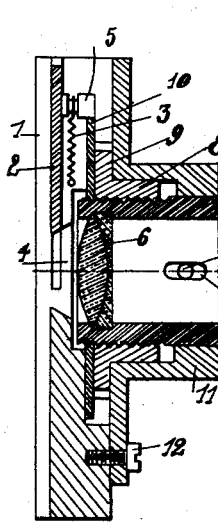
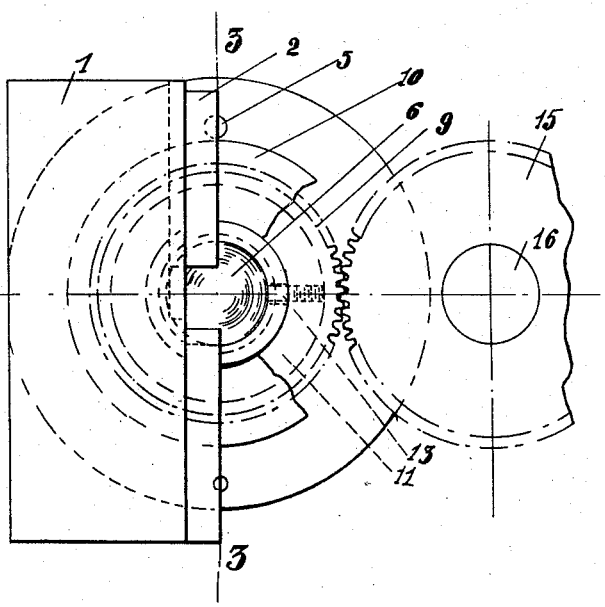
Inventors:
V. Continsouza
& M.B. Combes

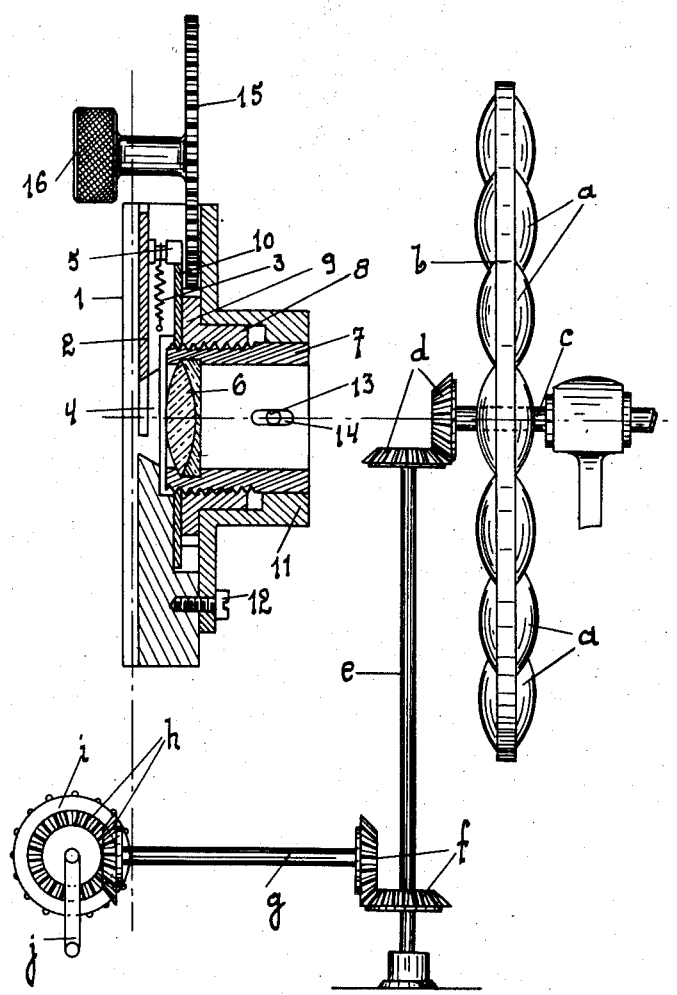

Patented Dec. 10, 1929

1,739,442

UNITED STATES PATENT OFFICE

VICTOR CONTINSOUZA AND MAURICE BAPTISTE COMBES, OF PARIS, FRANCE

CORRECTING DEVICE FOR CINEMATOGRAPHS WITH CONTINUOUSLY-MOVING FILMS

Application filed March 17, 1927, Serial No. 176,229, and in France April 27, 1926.

The pitch or length of the picture-sections in cinematograph films is subject to variation, generally below its normal value, by some tenths of a millimetre, which variation is liable to produce a defect in the fixity of the projected image in cinematographs with continuous feed of the film.

Optical correcting devices have been described, allowing the correction of such variations in the pitch of the film in cinematographs with continuously moving film, especially in those apparatus where the compensation for the movement of the film is effected by means of an endless series of movable objective lenses (see in particular the French patents Mortier No. 388,933 and Zeiss No. 552,564).

According to the latter of these patents, there is arranged between the film and the series of movable objective lenses, a convergent lens of which the focal length and the distance to the film correspond to the formation of an enlarged virtual image of the film picture-sections. By varying the distance from this lens to the film, the pitch of the virtual image can be kept constant in spite of variations in the pitch of the film, as shown by the calculations appearing in the specification No. 552,564, and fixity of the projected image can be secured.

However, the distance from the virtual image to the endless series of objectives then varies to an extent sufficiently great to render necessary a refocusing of the system, which involves the displacement of the endless series of objectives, that is to say, of a relatively heavy mass. The adjustment of the lens which corrects the pitch of the film may be combined with that of the endless series of objectives, as indicated likewise in the Mortier patent already mentioned.

The object of the present invention is to obviate the displacement of the means for compensating the movement of the film during the correction of the irregularities of pitch.

For this purpose the correcting lens is arranged in such a way that its optical centre is situated in the plane of the film or very near to this plane.

In these conditions, the said lens can exert no effect or only a negligible one when the pitch of the film does not require correction; in case of variation of the pitch of the film, the displacement of the lens results in producing a virtual image which is enlarged only by an amount equal to the actual variation of the pitch, an amount sufficiently small for the plane of the virtual image not to exceed the limits of the depth of focus of the objectives.

The correction of the pitch of the film then no longer involves any refocusing, nor consequently any displacement of the means for compensating the movement of the film; the adjustment of the correcting lens suffices in itself alone for ensuring the fixity of the projected image in spite of the irregularities of the pitch of the film.

In theory, the shorter the focal length of the lens, the less the displacement of the plane of the virtual image for a given variation of its dimensions, but the aberrations are the more noticeable as the focus is shortened. In order to reduce them to the minimum, it is therefore preferable to select in practice a lens having relatively long focus (for example 400 millimetres) which corresponds to a sufficiently small maximum displacement of the plane of the virtual image.

The correcting lens may be convergent or divergent, focusing being effected in the first case for the maximum pitch of the film and in the second case for its minimum pitch.

The adjustment of the correcting lens may be combined with advantage with that of the edges of the projection aperture or window, according to the French Patent Number 611,901 filed by the present applicants on June 17th, 1925, for "Improvements in cinematographs with continuous feed of the film."

The annexed drawing gives a diagram of the principal of the arrangement according to the invention and also represents by way of example one form of construction thereof combined with a device for adjusting the projection aperture.

Figure 1 is the theoretical diagram.

Figure 2 is a front view of the form selected as example, the right half of the window being supposed removed.

Figure 3 is a longitudinal section of Figure 2 on the vertical plane 3—3.

Figure 4 is a view partly in side elevation and partly in vertical section illustrating the several units of the apparatus in their proper relative positions.

In Figure 1, F represents the film, $p^m$ the maximum pitch of the film (practically 19 millimetres), and $a$ designates the objective lenses of pitch $d$. These lenses are carried by a disc $a^1$, secured upon a rotary shaft $a^2$, parallel to the axis of projection and to which a rotary movement is imparted in any suitable manner (not shown). The distance from the film to the objectives is D, and these objectives give an image $F^1$ of the film at a distance $D^1$; $D^1$ may have any desired value and the image may be virtual or real. The whole system is combined in such a way that $$d = \frac{p^m \times D^1}{D^1 \div D}.$$

The image $F^1$ will be stationary when the film and the objectives move parallel and synchronously with one another. If there is placed against the film a convergent lens L of sufficiently great focal length (for example 400 millimetres), the virtual image of the film given by this lens will practically coincide with the film itself and the projection will not be affected in any way.

If, instead of the maximum pitch of 19 millimetres, the film has the minimum pitch (practically 18.7 millimetres), the lens L will have to be displaced in such a way as to bring it to $L^1$ at a distance of 6 millimetres from the film. The virtual image of this latter will then be at 6.09 millimetres from the lens and the pitch of this image will be equal to 19 millimetres. The image $F^1$ will again become stationary and its definition will not be affected, as the displacement of .09 millimetres between the film and the virtual image is less than the depth of focus of the objectives.

In order to correct the irregularities in the pitch of the film, it suffices therefore to displace a single member (the lens L), which allows very easy construction of the correcting mechanism as well as the suppression of any refocusing device, and therefore great simplification of the apparatus.

Moreover, the lens L, having a sufficiently great focal length and being placed quite close to the film, will cause no distortion of the image, so that a simple achromatic lens will be sufficient. It is evident that there might be utilized a lens of longer or shorter focus, the essential condition being that for the correct pitch of the film this lens shall be placed aganst the film so as to exert only a negligible effect.

The arrangement according to the invention might likewise be carried out in such a way that $$d = \frac{p \times D^1}{D^1 \div D}$$

for the smallest pitch of the film. In this case the lens would be divergent and placed against the film, the lens being displaced as above for the maximum pitch, and the virtual image of smaller dimensions than the film section remaining always situated within the depth of focus of the objectives.

Figures 2 and 3 show how the adjustment of the correcting lens can be combined with the regulation of the edges of the projection aperture or window, in such a way that a single movement suffices for correcting all the consequences of irregularities in the pitch of the film.

Upon these figures, 1 is the film gate. A plate 2 mounted slidably in the gate and controlled by the spring 3 forms one of the edges of the window or aperture 4; the plate 2 is provided with a stud 5.

The correcting lens 6 is mounted in a tube 7 screw-threaded on the exterior, upon which is screwed a nut 8. This nut carries a toothed crown 9 as well as a cam 10 upon which the stud 5 bears. A guide 11 acts to centre the whole assembly; this guide 11 is fixed upon the gate by means of screws 12 and it carries a peg 13 entering a longitudinal slot 14 in the tube 7.

The teeth upon the member 9, integral with the nut 8, mesh with the teeth of a wheel 15 carrying an operating knob 16 which is thus easily accessible.

By turning the knob 16 in the desired direction the nut 8 is caused to rotate; since the nut is unable to move longitudinally and the tube 7 is unable to turn because of the peg 13, the tube 7 and the lens 6 are displaced longitudinally, which movement produces the desired correction for the pitch of the film. The cam 10 which is fast with the nut 8 revolves with it; this cam is of a shape such that the movable edge 2 of the window, acted upon by the spring 3, is displaced so that the height of the projection aperture or window becomes equal to the pitch of the film to be projected.

In Figure 4 of the drawing $a$ designates the lenses for compensating for the movement of the film which lenses are mounted in a circular series upon the plate $b$. This plate is carried by a shaft $c$ which is rotated through the operation of a hand crank $j$ fixed upon the shaft of a toothed drum $i$ about which the film passes. The shaft of the drum is connected for rotation in unison with the shaft $c$ through the intermediary of two perpendicular shafts $e$ and a shaft $d$ to which motion is transmitted from the shaft of the drum $i$ through the bevel gears $h$ and to the shaft $e$ through the medium of bevel gears $f$, the shaft $c$ being driven from the shaft $e$ through the medium of bevel gears $d$.

It is evident that the invention is not limited to these forms and details of construction, but that it may give rise to modifications.

What we claim is:

1. In a cinematograph with continuously moving film, the combination with a series of optical compensating members interposed between the film and the screen, means for imparting to said series of members a movement parallel to the film during the passage of the film through the luminous beam, a lens arranged between the film and said series of optical compensating members, a projection aperture near the film, means adapted for displacing said lens along the projection axis, means for varying the height of the said projection aperture, and connecting means between the two regulating means.

2. In a cinematograph with continuously moving film, the combination with a series of optical compensating members interposed between the film and the screen, means for imparting to said series of members a movement parallel to the film during the passage of the film through the luminous beam, a lens arranged between the film and said series of optical compensating members, an externally threaded slidable socket carrying said lens, a rotatable nut member in mesh with said socket, a projection aperture, means for varying the height of the said projection aperture, and connecting means between the said nut and the means controlling the height of the projection aperture.

3. In a cinematograph with continuously moving film, the combination with a series of optical compensating members interposed between the film and the screen, means for imparting to said series of members a movement parallel to the film during the passage of the film through the luminous beam, a lens arranged between the film and said series of optical compensating members, means for displacing said lens along the projection axis, a projection aperture near the film, provided with a stationary and with a movable lip, means for displacing said movable lip, and connecting means between the two regulating means.

4. In a cinematograph with continuously moving film, the combination with a series of optical compensating members interposed between the film and the screen, means for imparting to said series of members a movement parallel to the film during the passage of the film through the luminous beam, a lens arranged between the film and said series of optical compensating members, an externally threaded socket member, carrying said lens, a rotatable nut member in mesh with said socket, a projection aperture provided with a stationary and with a movable lip, a stud on the movable lip, and a cam fast with the rotatable nut member in engagement with the said stud for the purpose described.

In testimony whereof we have signed our names to this specification.

VICTOR CONTINSOUZA.
MAURICE BAPTISTE COMBES.